(12) United States Patent
Wolff et al.

(10) Patent No.: US 12,495,814 B2
(45) Date of Patent: Dec. 16, 2025

(54) METHODS OF PRODUCING ANIMAL-FREE CASEIN COMPOSITIONS, CASEIN COMPOSITIONS AND USE OF SAME

(71) Applicant: RE-MILK LTD, Ness Ziona (IL)

(72) Inventors: Aviv Wolff, Ness Ziona (IL); Vera Gaydar, Ness Ziona (IL); Ori Cohavi, Ness Ziona (IL)

(73) Assignee: RE-MILK LTD, Ness Ziona (IL)

( * ) Notice: Subject to any disclaimer, the term of this patent is extended or adjusted under 35 U.S.C. 154(b) by 341 days.

(21) Appl. No.: 18/041,576

(22) PCT Filed: Aug. 17, 2021

(86) PCT No.: PCT/IL2021/050998
§ 371 (c)(1),
(2) Date: Feb. 14, 2023

(87) PCT Pub. No.: WO2022/038601
PCT Pub. Date: Feb. 24, 2022

(65) Prior Publication Data
US 2023/0292789 A1   Sep. 21, 2023

(30) Foreign Application Priority Data
Aug. 19, 2020   (IL) .......................................... 276823

(51) Int. Cl.
A23J 3/10   (2006.01)
(52) U.S. Cl.
CPC ...................................... A23J 3/10 (2013.01)
(58) Field of Classification Search
CPC ...................................................... A23J 3/10
See application file for complete search history.

(56) References Cited

FOREIGN PATENT DOCUMENTS

| | | | |
|---|---|---|---|
| CN | 104159592 A | 11/2014 | |
| CN | 104256578 A | 1/2015 | |
| WO | 2013186376 A1 | 12/2013 | |
| WO | 2016029193 A1 | 2/2016 | |
| WO | 2018039632 A1 | 3/2018 | |
| WO | 2019213155 A1 | 11/2019 | |
| WO | 2020061503 A1 | 3/2020 | |
| WO | 2020081789 A1 | 4/2020 | |
| WO | 2020219595 A1 | 10/2020 | |
| WO | 2020219596 A1 | 10/2020 | |
| WO | 2021050759 A2 | 3/2021 | |
| WO | 2021168343 A2 | 8/2021 | |
| WO | 2022031941 A1 | 2/2022 | |
| WO | 2022104227 A1 | 5/2022 | |
| WO | 2022239000 A1 | 11/2022 | |
| WO | 2023122280 A2 | 6/2023 | |
| WO | 2023150696 A2 | 8/2023 | |
| WO | 2023192711 A1 | 10/2023 | |
| WO | 2023194480 A1 | 10/2023 | |
| WO | 2023220191 A1 | 11/2023 | |
| WO | 2024020514 A1 | 1/2024 | |
| WO | 2024020592 A1 | 1/2024 | |
| WO | 2024134646 A1 | 6/2024 | |
| WO | 2024134648 A1 | 6/2024 | |
| WO | 2024246898 A1 | 12/2024 | |
| WO | 2025004027 A1 | 1/2025 | |

OTHER PUBLICATIONS

Aoki (1989) Incorporation of individual casein constituents into casein aggregates cross-linked by colloidal calcium phosphate in artificial casein micelles. Journal of Dairy Research 56(4): 613-618.
Burnett and Burnett (2020) Therapeutic recombinant protein production in plants: Challenges and opportunities. Plants. People, Planet 2: 121-132.
Gatti et al., (1999) Effect of the anion citrate on the mineral composition of artificial casein micelles. J Agric Food Chem 47(1): 141-144.
Gomes et al., (2016) An Overview of Heterologous Expression Host Systems for the Production of Recombinant Proteins. Advances in Animal and Veterinary Sciences 4(4): 346-356.
Knoop et al., (1979) Sub-structure of synthetic casein micelles. J Dairy Res 46(2): 347-350.
Le et al., (2017) Proteomics of major bovine milk proteins: Novel insights. Accepted Manuscript, doi: 10.1016/j.idairyj.2016.11.016. Published in final edited version as: International Dairy Journal 67: 2-15.
Macauley-Patrick et al., (2005) Heterologous protein production using the Pichia pastoris expression system. Yeast 22(4): 249-270.
McMahon and Brown (1984) Composition, Structure, and Integrity of Casein Micelles: A Review. Journal of Dairy Science 67(3): 499-512.
Schmidt (1979) Properties of artificial casein micelles. J Dairy Res 46(2): 351-355.
Schmidt et al., (1977) Properties of artificial casein micelles, 1: Preparation, size distribution and composition. Netherlands Milk and Dairy Journal 31: 328-341.
Zakharchenko et al., (2012) Chaperone-like activity of β-casein and thermal stability of alcohol dehydrogenase. Russian Journal of Bioorganic Chemistry vol. 38(2): 192-197.
Zhang and Aoki (1995) Effect of Modification of Amino Groups on Crosslinking of Casein by Micellar Calcium Phosphate. Journal of Dairy Science 78(1): 36-43.
Li et al., (2018) Self-association of bovine B-casein as influenced by calcium chloride, buffer type and temperature. Food Hydrocolloids. Accepted Manuscript, doi: https://doi.org/10.1016/j.foodhyd.2018.09.035. 37 pages.
O'Connell et al., (2003) Association behavior of beta-casein. J Colloid Interface Sci 258(1): 33-39.

(Continued)

*Primary Examiner* — Robert A Wax
(74) *Attorney, Agent, or Firm* — Ballard Spahr LLP (57) ABSTRACT

The present disclosure provides a method of artificially-producing casein micelles under non-natural conditions. Also provided by the present disclosure are casein micelles and casein compositions comprising the casein micelles. Uses of the casein micelles and/or compositions are also disclosed.

13 Claims, 1 Drawing Sheet

(56) References Cited

OTHER PUBLICATIONS

Fan Jin-bo et al., (2014) Advances in structure and physicochemical properties of casein micelle. Science and Technology of Food Industry 35(03): 396-400. Abstract.

Han Qing-bo and Liu Jing (2007) Casein micelle structure and its effects on the stability of milk. China Dairy Industry 35(2): 43-44, 59. Abstract.

METHODS OF PRODUCING ANIMAL-FREE CASEIN COMPOSITIONS, CASEIN COMPOSITIONS AND USE OF SAME

TECHNOLOGICAL FIELD

The present disclosure relates to the food industry, and specifically to methods for producing food-grade casein micelles, casein-based food ingredients, and products therefrom.

BACKGROUND ART

References considered to be relevant as background to the presently disclosed subject matter are listed below:
Donald J MacMahon and Rodney J Brown "*Composition, Structure, and Integrity of Casein Micelles" A Review*" J Dairy Sci 67:99-512 (1984)
Thao T Le et al. "*Proteomics of major bovine milk proteins: Novel insights*" International Dairy Journal 67:2-15 (2017) [http://dx.doi.org/10.1016/j.idairyj.2016.11.016]
Schmidt D. G. et al. "*Properties of artificial casein micelles. Preparation, size distribution and composition*", Neth. Milk Dairy J. 31:328-341 (1977)
Schmidt D. G. et al. "*Properties of artificial casein micelles*", Journal of Dairy Research 46:351-355 (1979)
Aoki Takayoshi "*Incorporation of individual casein constituents into casein aggregates cross-linked by colloidal calcium phosphate in artificial casein micelles*", Journal of Dairy Research 56:613-618 (1989)
International Patent Application Publication No. WO2018/039632
International Patent Application Publication No. WO2020/081789

Acknowledgement herein of the above references is not to be inferred as meaning that these are in any way relevant to the patentability of the presently disclosed subject matter.

BACKGROUND

Native bovine casein micelles comprise four different casein proteins, $\alpha s1$, $\alpha s2$, $\beta$ and $\kappa$, and a combination of minerals including calcium, phosphate, magnesium, and citrate [Donald J MacMahon and Rodney J Brown (1984)].

The preparation of artificial casein micelles has been described already in 1977 by Schmidt et al. Specifically, Schmidt et al. describes a method of preparing artificial casein micelles from mixtures of isolated casein proteins and calcium, magnesium, phosphate and citrate solutions. [Schmidt et al. 1977]. The amounts of each of the micelle's component was also described [Thao T Le et al (2016); Schmidt D. G. et al. (1979)].

In addition, Schmidt et al. provided a survey on the relationship between various properties of the artificial casein micelle system and their composition with respect to the different casein proteins, colloidal phosphate, and citrate [Schmidt (1977)].

Later, the preparation of artificial casein micelles at different calcium, phosphate and citrate concentrations, and cross-linking of the casein by colloidal Ca phosphate (CCP) was described [Aoki Takayoshi 1989].

More recently, the incorporation of recombinantly-produced proteins, including recombinantly-produced casein, into food products, was described by Perfect Day Inc. [WO2018/039632 and WO2020/081789].

GENERAL DESCRIPTION

The present disclosure provides, in accordance with one of its aspects, a method for producing a casein micelle, the method comprising contacting at least one casein protein selected from the group consisting of $\alpha_{s1}$ casein, $\alpha_{s2}$ casein, $\beta$-casein and $\kappa$-casein, with a liquid medium comprising calcium and phosphate,
wherein said liquid medium has a pH of between about 5.0 and 6.5; or
wherein said phosphate is present at a molar concentration that is equal to or below about 20 mM; or
wherein the molar ratio between said calcium and said phosphate is greater than 1.1.

In certain examples, the at least one casein protein is not $\kappa$ casein as a sole casein protein.

In a further aspect, the present disclosure provides casein micelle obtainable or obtained by the method disclosed herein.

In a further aspect, the present disclosure provides a casein micelle, comprising at least one casein protein, the casein protein consisting of:
(i) $\beta$ casein and $\kappa$ casein,
(ii) $\alpha_{s1}$ casein, $\alpha_{s2}$ casein and $\kappa$ casein,
(iii) $\alpha_{s1}$ casein, $\alpha_{s2}$ casein, and $\beta$ casein,
(iv) $\beta$ casein, or
(v) $\kappa$ casein.

In yet a further aspect, the present disclosure provides a casein-based composition comprising casein micelles in a liquid medium, the composition comprising at least one casein protein and calcium and phosphate, wherein:
said liquid medium has a pH of between about 5.0 and 6.5; and/or
said phosphate is present at a molar concentration that is equal to or below 20 mM; and/or
the molar ratio between said calcium and said phosphate is greater than 1.1.

In the context of the present disclosure, when the micelles comprise $\kappa$ casein as a sole casein protein, said micelles are within a calcium and/or phosphate free medium.

The different casein compositions are of particular use as a food ingredient in the manufacture or consumer goods, such as vegan alternatives to dairy products.

Thus, in accordance with yet a further aspect, the present disclosure provides an edible product comprising a casein composition disclosed herein.

BRIEF DESCRIPTION OF THE DRAWINGS

To better understand the subject matter that is disclosed herein and to exemplify how it may be carried out in practice, embodiments will now be described, by way of non-limiting example only, with reference to the accompanying drawings, in which.

DETAILED DESCRIPTION

The present disclosure is based on the finding that it is possible to obtain functional casein micelles from even a single isolated type of casein protein when using a calcium phosphate buffer with concentrations that are uniquely and unexpectedly different from their concentration within bovine milk (their concentration within bovine milk being 30 mM and 30 mM, respectively).

A unique feature of the casein compositions of the present disclosure is that they are artificially formed, are stable and functional at a pH that is below the native pH of the micelles in bovine milk (pH 6.7). In fact, it has been found, as also described below, that the casein micelles, according to the present disclosure, are stable and functional at a pH between 5 and 6.5, even between 5 and 6.4, even between 5.1 and 6.3, even between 5.2 and 6.2, even between 5.3 and 6.1, even between 5.5 and 6.0.

As will be further described hereinbelow, the method disclosed herein allows to produce allergen-free casein micelles and has an advantage of providing products comprising such micelles to casein-sensitive individuals. Further, the method disclosed herein uniquely provides a faster coagulation time while maintaining a same curd strength obtained from natural casein micelles.

Specifically, the present disclosure is based, in part, on the finding that a functional casein micelle can be obtained using even a single milk-isolated or recombinant casein protein, when the casein micelle comprises phosphate that is at a concentration that is at least 10% below the concentration of the phosphate in natural bovine milk; and/or the calcium:phosphate is present at a molar ratio that is greater than 1.

As appreciated by those versed in the art, natural casein micelles are found in the presence of calcium and phosphate at a concentration of about 30 mM for each (thus, a molar ratio of about 1:1) [Donald J MacMahon and Rodney J Brown (1984), the content of which is incorporated herein in its entirety, by reference]. The role of calcium concentration on the micelle stability is recognized. In fact, it is commonly accepted that the composition of bovine milk is the result of an evolutionary process aimed to provide highly optimized nutrition values, in the form of casein micelles, for the calve. Thus, it is unexpected that a significant deviation from the natural concentrations of calcium and phosphate would result in superior micelles in terms of stability and functionality.

Based on the current finding, various artificially-made casein micelles have been produced, which are homogenous in size, stable (e.g. do not aggregate or disintegrate in time) and functional.

Specifically, and in accordance with one of its aspects, the present disclosure provides casein compositions comprising casein micelles in an aqueous medium, the composition comprising at least one casein protein and calcium and phosphate, with at least one of said calcium and said phosphate being at a concentration that fulfills at least one of the following conditions:

the at least one casein protein is not κ-casein as the sole casein protein; or the liquid medium has a pH of between about 5.0 and 6.5; or the phosphate is present in the casein composition at a molar concentration that is equal to or below 20 mM; or the molar ratio between said calcium and said phosphate is greater than 1.1.

In some examples, the at least one casein protein is not κ-casein as the sole casein protein. In some examples, the liquid medium has a pH of between about 5.0 and 6.5. In some examples, the phosphate is present in the casein composition at a molar concentration that is equal to or below 20 mM. In some examples, the molar ratio between said calcium and said phosphate is greater than 1.1.

In some examples, the liquid medium has a pH of between about 5.0 and 6.5, and the phosphate is present in the casein composition at a molar concentration that is equal to or below 20 mM. In some examples, the liquid medium has a pH of between about 5.0 and 6.5, and the molar ratio between said calcium and said phosphate is greater than 1.1. In some examples, the phosphate is present in the casein composition at a molar concentration that is equal to or below 20 mM, and the molar ratio between said calcium and said phosphate is greater than 1.1.

In some examples, the at least one casein protein is not κ-casein as the sole casein protein, the liquid medium has a pH of between about 5.0 and 6.5, and the phosphate is present in the casein composition at a molar concentration that is equal to or below 20 mM. In some examples, the at least one casein protein is not κ-casein as the sole casein protein, the liquid medium has a pH of between about 5.0 and 6.5, and the molar ratio between said calcium and said phosphate is greater than 1.1. In some examples, the at least one casein protein is not κ-casein as the sole casein protein, the phosphate is present in the casein composition at a molar concentration that is equal to or below 20 mM, and the molar ratio between said calcium and said phosphate is greater than 1.1.

In some examples, the at least one casein protein is not κ-casein as the sole casein protein, the liquid medium has a pH of between about 5.0 and 6.5, and the phosphate is present in the casein composition at a molar concentration that is equal to or below 20 mM. In some examples, the at least one casein protein is not κ-casein as the sole casein protein, the liquid medium has a pH of between about 5.0 and 6.5, and the molar ratio between said calcium and said phosphate is greater than 1.1. In some examples, the at least one casein protein is not κ-casein as the sole casein protein, the phosphate is present in the casein composition at a molar concentration that is equal to or below 20 mM, and the molar ratio between said calcium and said phosphate is greater than 1.1. In some examples, the liquid medium has a pH of between about 5.0 and 6.5, the phosphate is present in the casein composition at a molar concentration that is equal to or below 20 mM, and said phosphate is greater than 1.1.

In some examples, the at least one casein protein is not κ-casein as the sole casein protein, the liquid medium has a pH of between about 5.0 and 6.5, the phosphate is present in the casein composition at a molar concentration that is equal to or below 20 mM, and the molar ratio between said calcium and said phosphate is greater than 1.1.

Unless otherwise indicated, the term "liquid medium" as used herein generally refers to water.

In the context of the present disclosure, when referring to a "casein protein" it is to be understood as encompassing a casein protein as found in nature, e.g. in bovine milk, a functional fragment thereof, a recombinant analog thereof.

In the context of the present invention, when referring to "at least one casein protein" it is to be understood as encompassing the casein proteins found in nature as well as any functional fragments, or functional derivatives or homologues thereof, and combination of functional fragments, derivatives or homologues thereof.

When referring to functional fragments it is to be understood as referring to an amino acid sequence that is shorter (i.e. contains less amino acids) from the casein protein found in nature, and yet, when optimally aligned with the complete native casein sequence, contains at least 80%, at times at least 85%, at times at least 90%, at times at least 95% or even 99% or 100% identity with the sequence with which it is aligned.

When referring to functional derivatives or homologues of casein proteins, it is to be understood to encompass proteins of essentially similar length as the native protein. Such functional derivatives or homologues would at least have 80%, at times at least 85%, at times at least 90%, at times at least 95% or even 99% sequence identity with the native protein when optimally aligned therewith, and exhibit at least one but preferably more than one of the commonly known distinguishing properties of the individual caseins, including, inter alia, low solubility at pH 4.6, phosphate groups esterified to serine residues, high number of proline residues, essentially no disulfide bonds, lack of tertiary structure and charge distribution unique to each casein protein.

The functional fragments, derivatives or homologues can be, without being limited thereto, natural isolated casein, recombinant casein, chemically modified casein, synthetic or semi-synthetic casein, all of which are capable to form casein micelles, and preferably, are capable of forming functional casein micelles.

In the context of the present disclosure when referring to "casein micelle" (also known by the term colloidal particles) it is to be understood as a micelle structure comprising at least one casein protein, calcium and phosphate, with the exception of κ-casein as a sole casein protein being excluded from the scope of casein micelles, in the context of the present disclosure. The micelle can comprise other non-casein components (e.g. non-casein proteins and peptides), and other minerals as further described below. 10

The approximate composition of bovine casein micelles was previously described by McMahon and Brown (1984) and includes:

| Component | Content g/100 g micelles |
| --- | --- |
| $\alpha_{s1}$-casein | 35.6 |
| $\alpha_{s2}$-casein | 9.9 |
| β-casein | 33.6 |
| κ-casein | 11.9 |
| Minor casein | 2.3 |
| Calcium | 2.9 |
| Phosphate | 2.9 |
| Magnesium | 0.1 |
| Sodium | 0.1 |
| Potassium | 0.3 |
| Citrate | 0.4 |
| Sialic acid | 0.3 |
| Galactose | 0.2 |
| Galactosamide | 0.2 |

In the context of the present disclosure, when referring to "functional casein micelles" it is to be understood to encompass casein micelles that are stable, namely, do not precipitate in the holding media within a period of at least 1 hour, at least 5 hours, at least 12 hours, at least one day, at times, within a period of two, three, four, five, six days or even within a period of one week, 2, 3, 4, weeks, or even within a period of 1, 2, 3, months from their formation, when stored at room temperature.

Further, in the context of the present disclosure, when referring to "functional casein micelles", it is to be understood as encompassing micelles that are capable of coagulating when being subjected to coagulation conditions. Coagulation conditions can include, for example, exposure to enzymes (e.g. Renin, also known as chymosin or rennet), acid treatment (e.g. lowering the pH to a level of destabilization or aggregation) and/or heat-acid treatment.

In some examples, the at least one casein protein comprises or consists of the $\alpha_{s1}$ casein protein.

In some examples, the at least one casein protein comprises or consists of the $\alpha_{s2}$ casein protein.

In some examples, the at least one casein protein comprises or consists of the $\alpha_{s1}$ casein and $\alpha_{s2}$ casein proteins (collectively referred to herein as the α casein protein). In some examples, the at least one casein protein comprises or consists of the $\alpha_{s1}$ casein and $\alpha_{s2}$ casein proteins (collectively referred to herein as the α casein protein) in a 4:1 molar ratio, respectively.

In some examples, the at least one casein protein comprises or consists of the β casein protein.

In some examples, the at least one casein protein comprises the κ casein protein. This example excludes cases where κ casein protein is the sole casein protein.

In some examples, the at least one casein protein comprises or consists of any one or both of the α casein proteins and the β casein protein.

In some examples, the at least one casein component comprises or consists of any one or both of the α casein components and the κ casein component.

In some examples, the at least one casein protein comprises or consists of the β casein protein and the κ casein protein.

In some examples, the at least one casein protein comprises or consists of any one or both of the α casein proteins, the β casein protein and the κ casein protein.

In some examples, the casein protein is natural or a naturally-occurring casein protein. In some examples, naturally-occurring casein protein is isolated from animal milk. In some examples, the natural casein protein is chemically-identical to naturally-occurring casein protein isolated from animal milk. The term "naturally-occurring" as used herein generally refers to a protein produced by cows and found in cow milk. The term "natural" as used herein generally refers to any protein produced by any method, which is chemically-identical to a corresponding protein produced by cows and found in cow milk.

In some examples, the casein protein is a recombinant protein. When referring to a recombinant protein it is to be understood as encompassing any protein or peptide encoded by the manipulation of the nucleic acid sequence coding for casein protein or fragment thereof (at times referred to as the "recombinant nucleic acid sequence") into an expression vector and expressing the same in other organisms (the "host organism"), such as bacteria, yeast, plant cells, animal cells, in culture.

The recombinant casein protein may not be identical to its corresponding, natural casein protein, and yet, in accordance with the present disclosure, comprises an amino acid sequence that is at least 80%, at times at least 85%, at times at least 90%, at times at least 95%, at times at least 99% to the sequence of its corresponding protein in bovine milk when both amino acid sequences are optimally aligned.

The recombinant casein protein may not be identical to its corresponding, natural casein protein from bovine milk also with respect to the level of phosphorylation. It was already described that the phosphorylation of the different casein proteins plays a role, inter alia, in the stability of the resulting micelles (McMahon and Brown 1984). The phosphorylation profile should be understood as encompassing any one of a higher number of phosphate groups as compared to the level thereof in the corresponding bovine casein protein, a lower number of phosphate groups as compared to the level thereof in the corresponding bovine casein protein, a different type of phosphate group (chemically different), a same number of phosphate groups, yet, with a different distribution along the amino acid chain etc.

As noted above, the recombinant casein protein is encoded by a nucleic acid sequence introduced into an expression vector. In some examples, this nucleic acid sequence is one that has been removed from its naturally occurring environment, namely, a nucleic acid sequence encoding the casein protein or fragment thereof but is flanked by a nucleic acid sequence that is different from the sequence with which it is associated or operatively linked to in bovine milk, such a sequence can also be one that is not present in nature.

The recombinant nucleic acid is introduced into an expression vector and the expression vector is introduced into a host cell according to methods known in the art.

The host organism (host cell) for the expression of the casein component recombinantly may vary.

In some examples, the host cell is a microbial host cell. The microbial host cell can be obtained using methods known in the art. The microbial host cell thus comprises the recombinant expression vector encoding the recombinant casein protein.

In some examples, the recombinant host cells are yeast cells. The term "yeast" as used herein refers to organisms of the order Saccharomycesales. Vegetative growth of yeast occurs by budding/blebbing of a unicellular thallus, and carbon catabolism may be fermentative.

A non-limiting list of yeast cells that can be utilized to produce recombinant casein proteins include *Pichia pastoris, Saccharomyces cerevisiae, Hansenula polymorpha, Kluyveromyces lactis, Candidia biodini, Schizosaccharomyces pombe, Arxula adeninivoran* and, *Yarrowia lipolytica*.

In some examples, the recombinant host cells are *Pichia Pastoris*.

The yeast *Pichia pastoris* is an example of yeast species used to produce recombinant proteins. The *Pichia pastoris* is at times a preferred choice as its expression includes tightly regulated and efficient promoters and a strong tendency for respiratory growth as opposed to fermentative growth. The use of *Pichia pastoris* as host cells is well documented, inter alia, in Macauley-Patrick Sue et al. *"Heterologous protein production using the Pichia pastoris expression system"* Yeast 22:249-270 (2005), the content of which is incorporated herein, in its entirety, by reference.

Without being limited thereto, when the host cell is a yeast cell, the expression vector can be one selected from pAO815, pPIC 3.5k, pPIC9, pPIC9K, pPICZA, pPICZB, pPICZC, pPICZalphaA, pPICZalphaB, pPICZalphaC, pESC-TRP, pESC-URA, pESC-HIS, pESC-LEU. The vectors in each list are commercially available and known.

In some other examples, the recombinant host cells are bacterial cells.

Bacterial cells are known for their high production yields, fast growth and easy genetic manipulation as described in Reena Gomes Amitha et al. *"An Overview of Heterologous Expression Host Systems for the Production of Recombinant Proteins"* Advances in Animal and Veterinary Sciences 4 (7) 346-356 (2016), the content of which is incorporated herein in its entirety, by reference. Bacterial production systems can be genetically engineered to allow post-translation modifications e.g. protein phosphorylation.

In some examples, the bacterial cells include gram-positive bacteria. In some other examples, the bacterial cells include gram-negative bacteria.

A non-limiting list of bacterial cells that can be utilized to produce recombinant casein proteins include *Escherichia coli, Bacillus subtilis, Bacillus megaterium, Lactococcus lactis, Ralstonia eutropha, Pseudomonas fluorescens, Vibrio natriegens* and *Corynebacterium glutamicum*.

When using, for example, *E. coli* as the host, the expression vector can be any one selected from the group consisting of pBluescript II KS(-), pBluescript II KS(+), pBluescript II SK(-), pBluescript II SK(+), pET-3a, pET-3b, pET-3c, pET-3d, pET-9a, pET-11a, pET-11b, pET-11c, pET-11d, pET-14b, pET-15b, pET-16b, pET-17b, pET-19b, pET-20b(+), pET-21a(+), pET-21b(+), pET-21d(+), pET-22b(+), pET-23a(+), pET-4a(+), pET-24b(+), pET-24c(+), pET-24d (+), pET-25b(+), pET-26b(+), pET-27b(+), pET-28a(+), pET-28b(+), pET-28c(+), pET-29a(+), pET-29b(+), pET-29c (+), pET-30a(+), pET-30b(+), pET-30c(+), pET-31b(+), pET-32a(+), pET-32b(+), pET-41a(+), pET-41b(+), pET-41c (+), pET-42a(+), pET-42b(+), pET-42c(+), pET-43.1a(+), pET-43.1b(+), pET-45b(+), pET-50b(+), pET-51b(+), pET-52b(+), pGEX-2TK, pGEX-4T-1, pGEX-4T-2, pGEX-4T-3, pGEX-5X-1, pGEX-5X-2, pGEX-5X-3, pGEX-6P-1, pGEX-6P-2, pGEX-6P-3, pMAL-c4x, pMAL-c5E, pMAL-c5x, pMAL-p5E, pMAL-p5G, pMAL-p5X, pQE-1, pQE-60, pGS-21a, pETDuet-1, pCDFDuet-1, pRSFDuet-1, pCOLA-Duet-1, pGEX-4T-1-H(RBS), pGEX-4T-1-M (RBS), pGEX-5X-1-H(RBS), pGEX-5X-1-M (RBS), pGEX-6P-1-, (RBS). pGEX-6P-1-M (RBS), pMAL-c4x-1-H(RBS), pMAL-c4x-1-M (RBS).

In some other examples, the recombinant host cells are fungus systems.

Fungus systems have been successfully used to secrete large amounts of recombinant proteins (Reena Gomes Amitha et al. *"An Overview of Heterologous Expression Host Systems for the Production of Recombinant Proteins"* Advances in Animal and Veterinary Sciences 4 (7) 346-356 (2016), the content of which is incorporated herein in its entirety, by reference).

A non-limiting list of fungus cells that can be utilized to produce recombinant casein proteins include filamentous fungi such as *Aspergillus niger, Aspergillus oryzae, Trichoderma reesei* and *Myceliophthora thermophila*.

In some other examples, the recombinant host cells are algae cells. Microalgae have unique advantages, including a high growth rate, ease of cultivation and metabolic pathways that are similar to those of higher plants, leading to the same post-transcriptional and posttranslational modifications that occur in higher plants. A non-limiting list of algae cells that can be utilized to produce recombinant casein components include *Chlorella reinhardtii* and *Dunaliella salina*.

In some examples, the recombinant host cells are insect cells. Expression systems utilizing insects as host cells are attractive due to the possibility to produce high levels of soluble recombinant proteins.

A non-limiting list of insect cells that can be utilized to produce recombinant casein proteins include Sf-9, Sf-21 and high five *Trichoplusia ni*.

A non-limiting list of examples of baculovirus/insect cells expression vectors include pBacPAK8, pBacPAK9, pAcG2T, pAcHLT A, pAcHLT B, pAcHLT C, pAcGHLT A, pAcGHLT B, pAcGHLT C, pAcSG2, pBAC-1, pFastBac1, pFastBacHT-A, pFastBacHT-B, pFastBacHT-C, pFastBac-Dual.

In some other examples, the recombinant host cells comprise mammalian cells. Expression systems utilizing mammalian cells are known for their ability to secrete properly folded, assembled, glycosylated and phosphorylated recombinant proteins that are fully active.

A non-limiting list of mammalian cells that can be utilized to produce recombinant casein components include HEK 293 and CHO cells.

When the host cells is a mammalian cell, the expression vector can be, for example, and without being limited thereto any one of pcDNA3.1(+), pcDNA3.1(−), pcDNA3.1 (+)_myc-His A, pcDNA3.1(+)_myc-His B, pcDNA3.1(+)_myc-His C, pcDNA3.1(−)_myc-His A, pcDNA3.1(−)_myc-His B, pcDNA3.1(−, myc-His C, pCI-Neo, pcDNA3.1+C-DYK, pcDNA3.1+C-HA, pcDNA3.1+C-6His, pcDNA3.1+C-Myc, pcDNA3.1+N-DYK, pcDNA3.1+N-HA, pcDNA3.1+N-6His, pcDNA3.1+N-Myc, pcDNA3.1+N-GST(Thrombin), pcDNA3.1+N-GST(TEV), pcDNA3.1/Hygro(+), pcDNA3.1/Hygro(−), pcDNA3.1/Zeo(+), pcDNA3.1/Zeo(−), pCMV-3Tag-1a, pCMV-3Tag-2a, pCMV-3Tag-3a, pCMV-3Tag-4a, pcDNA3.1+C-eGFP, pcDNA3.1+N-eGFP, pcDNA3.1+P2A-eGFP, pcDNA3.1−P2A, pcDNA3.1+N-DYK-P2A, pcDNA3.1+C-DYK-P2A, pCMV-3Tag-1a-P2A, pCMV-3Tag-3a-P2A.

It is noted that all vectors mentioned herein and others are commercially available.

In some other examples, the recombinant host cells are of transgenic plants. Both whole plants and plant cell cultures can be used to produce post-translationally modified recombinant proteins.

A non-limiting list of plant systems that can be utilized to produce recombinant casein proteins include tobacco plants, cereals (e.g. maize), legumes (e.g. soybean) and fruits and vegetables, e.g. potato as described in Burnett Matthew J. B. and Burnett Angela C. "*Therapeutic recombinant protein production in plants: Challenges and opportunities*" Plants, People, Planet. 2:121-132 (2020), the content of which is incorporated herein in its entirety, by reference.

The casein protein, be it the natural protein or fragment thereof, or a recombinant protein equivalent thereof, can be included in the casein compositions at different concentrations. Surprisingly, it has been found that the concentration of the casein protein does not affect the formation of micelles or their stability, and what is more important is the calcium and phosphate concentrations and the ratio therebetween. In other words, the functionality of the micelles is less dependent on the amount of the selected casein protein.

As shown below in the non-limiting examples, the concentration of the casein protein in the casein composition can vary and may, independently for each casein protein, be in the range of:

β-casein: between 0.9% and 10% or any range within this range.
κ-casein: between 0.3% and 10% and any range within this range.
Combination of αβ-casein: between 1% and 10% and any range within this range.
Combination of ακ-casein: between 1% and 10% and any range within this range.
Combination of βκ-casein: between 1% and 10% and any range within this range.
Combination of αβκ-casein: between 1% and 10% and any range within this range.

The casein composition may comprise other, non-casein components. In some examples, the casein composition comprises, in addition to the at least one casein protein, one or more other (non-casein) proteins. The non-casein protein can be part of the micelle or can be external to the micelle.

In some examples, the one or more other proteins are non-animal proteins.

In some examples, the one or more other proteins are non-mammal-derived proteins.

In yet some other examples, the one or more other proteins are animal-free proteins.

In some examples, the one or more other proteins comprise plant protein(s) including fragments of plant proteins. These may include, without being limited thereto, proteins derived from green pea, yellow pea, chickpea, *faba* bean, lentils, soy, mung bean, rice and wheat.

In some examples, the non-casein protein is a whey protein or a fragment thereof.

In some examples, the non-casein protein is not a whey protein or a fragment thereof.

The casein composition comprises, in addition to its protein component (either the casein protein and/or the non-casein protein), a mineral/salt buffer which facilitates the formation of the micelles. A unique feature of the present disclosure resides in the fact that the buffer of the casein composition is substantially different from the composition of minerals in natural (bovine) milk. On the other hand, when using the amounts of the minerals (and specifically calcium and phosphate) naturally present in bovine milk (see Table 2 below) the micelles that are formed lack, at least, the capability to coagulate by rennin.

In some examples, the casein composition comprises phosphate at a concentration that is equal to or below about 28 mM, at times equal to or below about 27 mM, at times equal to or below about 26 mM, at times equal to or below about 25 mM, at times equal to or below about 24 mM, at times equal to or below about 23 mM, at times equal to or below about 22 mM, at times equal to or below about 21 mM, at times equal to or below about 20 mM, at times equal to or below about 19 mM, at times equal to or below about 18 mM, at times equal to or below about 17 mM, at times equal to or below about 16 mM, at times equal to or below about 15 mM, at times equal to or below about 14 mM, at times equal to or below about 13 mM, at times equal to or below about 12 mM, at times equal to or below about 11 mM, at times equal to or below about 10 mM, at times equal to or below about 9 mM, at times equal to or below about 8 mM, at times equal to or below about 7 mM, at times equal to or below about 5 mM.

In some examples, the casein formulation comprises phosphate at a concentration that is above about 0.5 mM; at times equal to or above about 1 mM; at times equal to or above about 2 mM; at times equal to or above about 3 mM; at times equal to or above about 4 mM; at times equal to or above about 5 mM; at times equal to or above about 6 mM, at times equal to or above about 7 mM, at times equal to or above about 8 mM, at times equal to or above about 9 mM, at times equal to or above about 10 mM, at times equal to or above about 11 mM, at times equal to or above about 12 mM, at times equal to or above about 13 mM, at times equal to or above about 14 mM, at times equal to or above about 15 mM, at times equal to or above about 16 mM, at times equal to or above about 17 mM, at times equal to or above about 18 mM, at times equal to or above about 19 mM, at times equal to or above about 20 mM, at times equal to or above about 21 mM, at times equal to or above about 22 mM, at times equal to or above about 23 mM, at times equal to or above about 24 mM, at times equal to or above about 25 mM, at times equal to or above about 26 mM, at times equal to or above about 27 mM.

In some examples, the casein composition comprises phosphate at a concentration that falls within any range between 0.5 mM and 20 mM, or within the range of between 5 mM and 19 mM, or within the range of between about 7 mM and 18 mM, at times between 8 mM and 20 mM.

In some examples, the casein composition comprises calcium at a concentration that is equal to or below about 55 mM, at times equal to or below about 50 mM, at times equal to or below about 45 mM, at times equal to or below about 40 mM, at times equal to or below about 38 mM, at times, equal to or below about 36 mM, at times equal to or below about 34 mM, at times equal to or below about 32 mM, at times equal to or below about 30 mM, at times equal to or below about 28 mM, at times equal to or below about 26 mM, at times equal to or below about 24 mM, at times equal to or below about 22 mM, at times equal to or below about 20 mM, at times equal to or below about 18 mM, at times equal to or below about 16 mM, at times equal to or below about 14 mM, at times equal to or below about 12 mM, at times equal to or below about 10 mM, at times equal to or below about 8 mM, at times equal to or below about 6 mM.

In some examples, the casein composition comprises calcium at a concentration that is equal to or above about 4 mM, at times equal to or above about 6 mM, at times equal to or above about 8 mM, at times equal to or above about 10 mM, at times equal to or above about 12 mM, at times equal to or above about 14 mM, at times equal to or above about 16 mM, at times equal to or above about 18 mM, at times equal to or above about 20 mM, at times equal to or above about 22 mM, at times equal to or above about 24 mM, at times equal to or above about 26 mM, at times equal to or above about 28 mM, at times equal to or above about 30 mM, at times equal to or above about 32 mM, at times equal to or above about 34 mM, at times equal to or above about 36 mM, at times equal to or above about 38 mM, at times equal to or above about 40 mM, at times equal to or above about 45 mM, at times equal to or above about 50 mM, at times equal to or above about 55 mM.

In some examples, the casein composition comprises calcium at a concentration that falls within any range (inclusive) between 5 mM and 55 mM, for example, between 10 mM and 45 mM, between 15 mM and 30 mM, between 20 mM and 55 mM, between 20 mM and 30 mM, between 20 mM and 40 mM, between 30 mM and 40 mM, between 25 mM and 40 mM, at times between 15 mM and 50 mM or any other range within 5 mM and 55 mM.

In some examples, the casein composition comprises calcium at a concentration of about 15 mM, about 20 mM, about 25 mM, about 30 mM, about 35 mM, about 40 mM, or at any range of concentrations within said concentrations.

In some examples, the casein composition comprises a calcium to phosphate molar ratio of at least 1.1, at times at least 1.2, at times at least 1.5, at times at least 2, at times at least 2.2, at times at least 2.5.

In some examples, the casein composition comprises a calcium to phosphate molar ratio within the range (inclusive) of between 1.1 and 8, at times, between 1.2 and 5.5, at times between 2 and 7, at times between 1.5 and 6, at times between 2 and 6, at times between 2.5 and 5.5, at times between 1.5 and 2.5, at times between 2.5 and 6, at times between 2 and 5, at times between 2 and 3, at times between 2 and 2.5, at times 2.2.

In some examples, the casein composition comprises a combination of calcium at a concentration that falls within the range (inclusive) between about 30 and 40 mM and a phosphate at a concentration that falls within the range (inclusive) between about 10 mM and 20 mM.

In some other examples, the casein composition comprises a combination of calcium at a concentration that falls within the range (inclusive) between about 20 and 30 mM and a phosphate at a concentration that falls within the range (inclusive) between about 5 mM and 15 mM.

In some examples, the casein composition comprises a combination of calcium at a concentration that falls within the range (inclusive) between about 5 mM and 20 mM and a phosphate at a concentration that falls within the range (inclusive) between about 1 mM and 10 mM.

In some examples, the casein composition comprises a combination of calcium at a concentration between about 10 mM and 30 mM (inclusive), and a phosphate at a concentration between about 5 mM and 15 mM (inclusive), with the molar ratio between the calcium concentration and the phosphate concentration being maintained above 2 (encompassing the hereinbelow defined "β low" and "β medium" compositions). Without being limited thereto, this combination was found to be preferable when the casein composition comprises β casein as the sole casein protein.

In some examples, the casein composition comprises a combination of calcium at a concentration between about 30 mM and 40 mM (inclusive), and a phosphate at a concentration between about 10 mM and 20 mM (inclusive), with the molar ratio between the calcium concentration and the phosphate concentration being maintained above 2. Without being limited thereto, this combination was found to be preferable when the casein composition comprises a combination of α casein and β casein as the casein protein (herein referred to as the "αβ low" formulation)

In some examples, the casein composition comprises a combination of calcium at a concentration between about 30 mM and 40 mM (inclusive), and a phosphate at a concentration between about 10 mM and 20 mM (inclusive), with the molar ratio between the calcium concentration and the phosphate concentration being maintained above 2. Without being limited thereto, this combination was found to be preferable when the casein composition comprises a combination of α casein and β casein as the casein protein (herein referred to as the "ακ medium" or "ακ high" compositions).

In some examples, the casein composition comprises a combination of calcium at a concentration between about 20 mM and 30 mM (inclusive), and a phosphate at a concentration between about 8 mM and 15 mM (inclusive), with the molar ratio between the calcium concentration and the phosphate concentration being maintained above 2. Without being limited thereto, this combination was found to be preferable when the casein composition comprises a combination of β casein and κ casein as the casein protein (herein referred to as the "βκ medium" or "βκ low" compositions).

In some examples, the casein composition comprises a combination of calcium at a concentration between about 20 mM and 40 mM (inclusive), and a phosphate at a concentration between about 10 mM and 20 mM (inclusive), with the molar ratio between the calcium concentration and the phosphate concentration being maintained above 2. Without being limited thereto, this combination was found to be preferable when the casein composition comprises a combination of all casein proteins, including α casein, β casein and κ casein (herein referred to as the "αβκ high", "αβκ medium" or "αβκ low" compositions).

In some examples, the casein composition also comprises citrate. In some examples, the citrate concentration is equal to or below about 10 mM. In some examples, the citrate concentration is within a range of between about 1 mM and 10 mM (inclusive). In some examples, the citrate concentration is between about 3 mM and 9 mM. In some examples, the citrate concentration is between about 7 mM and 10 mM. In some examples, the citrate concentration is between about 5 mM and 8 mM. In some examples, the citrate concentration is between about 3 mM and 7 mM.

In some examples, the casein composition also comprises magnesium. In some examples, the magnesium concentration is equal to or below about 6 mM. In some examples, the citrate concentration is within a range of between about 1 mM and 6 mM (inclusive). In some examples, the magnesium concentration is between about 1 mM and 4 mM. In some examples, the magnesium concentration is between about 3 mM and 6 mM. In some examples, the magnesium concentration is between about 4 mM and 6 mM. In some examples, the magnesium concentration is between about 2 mM and 4 mM.

In accordance with the present disclosure, it should be appreciated that when referring to phosphate and calcium, these can be present in the composition in any form, including as a free salt or as a colloidal calcium phosphate (CCP).

In accordance with some examples, the concentration of the at least one casein protein is at least about 1 mg/ml. In accordance with some examples, the concentration of the total casein proteins is at least about 1 mg/ml. In accordance with some examples, the concentration of the at least one casein protein is at least about 3 mg/ml. In accordance with some examples, the concentration of the total casein proteins is at least about 3 mg/ml. In accordance with some examples, the concentration of the at least one casein protein is at least about 5 mg/ml. In accordance with some examples, the concentration of the total casein proteins is at least about 5 mg/ml. In accordance with some examples, the concentration of the at least one casein protein is at least about 10 mg/ml. In accordance with some examples, the concentration of the total casein proteins is at least about 10 mg/ml. In accordance with some examples, the concentration of the at least one casein protein is at least about 20 mg/ml. In accordance with some examples, the concentration of the total casein proteins is at least about 20 mg/ml. In accordance with some examples, the concentration of the at least one casein protein is at least about 30 mg/ml. In accordance with some examples, the concentration of the total casein proteins is at least about 30 mg/ml.

In accordance with some examples, the concentration of the at least one casein protein is up to about 100 mg/ml, inclusive. In accordance with some examples, the concentration of the total casein proteins is up to about 100 mg/ml, inclusive. In accordance with some examples, the concentration of the at least one casein protein is up to about 75 mg/ml, inclusive. In accordance with some examples, the concentration of the total casein proteins is up to about 75 mg/ml, inclusive. In accordance with some examples, the concentration of the at least one casein protein is up to about 50 mg/ml, inclusive. In accordance with some examples, the concentration of the total casein proteins is up to about 50 mg/ml, inclusive.

In accordance with some examples, the concentration of the one casein protein is at least about 1 mg/ml to about 100 mg/ml. In accordance with some examples, the concentration of the total casein proteins is about 1 mg/ml to about 100 mg/ml. In accordance with some examples, the concentration of the at least one casein protein is about 3 mg/ml to about 75 mg/ml. In accordance with some examples, the concentration of the total casein proteins is about 3 mg/ml to about 75 mg/ml. In accordance with some examples, the concentration of the at least one casein protein is about 5 mg/ml to about 50 mg/ml. In accordance with some examples, the concentration of the total casein proteins is about 5 mg/ml to about 50 mg/ml. In accordance with some examples, the concentration of the one casein protein is about 10 mg/ml to about 75 mg/ml. In accordance with some examples, the concentration of the total casein proteins is about 10 mg/ml to about 75 mg/ml. In accordance with some examples, the concentration of the at least one casein protein is about 20 mg/ml to about 60 mg/ml. In accordance with some examples, the concentration of the total casein proteins is about 20 mg/ml to about 60 mg/ml. In accordance with some examples, the concentration of the at least one casein protein is about 30 mg/ml to about 50 mg/ml. In accordance with some examples, the concentration of the total casein proteins is about 30 mg/ml to about 50 mg/ml.

In accordance with some examples, the concentration of the at least one casein protein is about 1 mg/ml. In accordance with some examples, the concentration of the total casein proteins is about 1 mg/ml. In accordance with some examples, the concentration of the at least one casein protein is about 3 mg/ml. In accordance with some examples, the concentration of the total casein proteins is about 3 mg/ml. In accordance with some examples, the concentration of the at least one casein protein is about 5 mg/ml. In accordance with some examples, the concentration of the total casein proteins is about 5 mg/ml. In accordance with some examples, the concentration of the at least one casein protein is about 10 mg/ml. In accordance with some examples, the concentration of the total casein proteins is about 10 mg/ml. In accordance with some examples, the concentration of the at least one casein protein is about 20 mg/ml. In accordance with some examples, the concentration of the total casein proteins is about 20 mg/ml. In accordance with some examples, the concentration of the at least one casein protein is about 30 mg/ml. In accordance with some examples, the concentration of the total casein proteins is about 30 mg/ml. In accordance with some examples, the concentration of the at least one casein protein is about 40 mg/ml. In accordance with some examples, the concentration of the total casein proteins is about 40 mg/ml. In accordance with some examples, the concentration of the at least one casein protein is about 50 mg/ml. In accordance with some examples, the concentration of the total casein proteins is about 50 mg/ml. In accordance with some examples, the concentration of the at least one casein protein is about 60 mg/ml. In accordance with some examples, the concentration of the total casein proteins is about 60 mg/ml. In accordance with some examples, the concentration of the at least one casein protein is about 70 mg/ml. In accordance with some examples, the concentration of the total casein proteins is about 70 mg/ml. In 20 accordance with some examples, the concentration of the at least one casein protein is about 80 mg/ml. In accordance with some examples, the concentration of the total casein proteins is about 80 mg/ml. In accordance with some examples, the concentration of the at least one casein protein is about 90 mg/ml. In accordance with some examples, the concentration of the total casein proteins is about 90 mg/ml. In accordance with some examples, the concentration of the at least one casein protein is about 100 mg/ml. In accordance with some examples, the concentration of the total casein proteins is about 100 mg/ml.

In accordance with some examples, the concentration of the β-casein protein is at least about 1 mg/ml. In accordance with some examples, the concentration of the β-casein protein is at least about 3 mg/ml. In accordance with some examples, the concentration of the β-casein protein is at least about 9 mg/ml. In accordance with some examples, the concentration of the β-casein protein is about 1 mg/ml to about 100 mg/ml. In accordance with some examples, the concentration of the β-casein protein is about 3 mg/ml to about 30 mg/ml.

In accordance with some examples, (i) the composition comprises β-casein as the sole casein protein, (ii) the composition comprises β-casein as the sole casein protein in an amount of about 9.3 mg/ml, (iii) the amount of salts being within the ranges of calcium 27.4-14.8 mM, (iv) the amount of salts being within the range of magnesium 3.65-1.97 mM, (v) the amount of salts being within the range of phosphate 6.6-12.3 mM, (vi) the amount of salts being within the range of citrate 3.7-6.9 mM, or any combination of (i)-(vi).

In accordance with some examples, (i) the composition comprises β-casein as the sole casein protein, (ii) the composition comprises β-casein as the sole casein protein in an amount of about 9.3 mg/ml, (iii) the amount of salts being within the ranges of calcium 27.4-14.8 mM, (iv) the amount of salts being within the range of magnesium 3.65-1.97 mM, (v) the amount of salts being within the range of phosphate 6.6-12.3 mM, and (vi) the amount of salts being within the range of citrate 3.7-6.9 mM.

In some examples, the β-casein composition, namely, that comprises β-casein as the sole casein protein, comprises β-casein in an amount of about 9.3 mg/ml; Calcium in an amount of about 27.4 mM, Magnesium in an amount of about 3.65 mM, phosphate in an amount of about 12.3 mM and citrate in an amount of about 6.9 mM. This composition is referred to herein by the abbreviation β-medium composition. As shown in the non-limiting Table 4B, this composition was found to provide stable micelles, obtain a milkiness appearance, provide stable micelles and sufficiently coagulate with Renin.

In some examples, the β-casein composition including β-casein as the sole casein protein (also in an amount of about 9.3 mg/ml) the amounts of the salts are lower and include calcium in an amount of about 14.8 mM, magnesium in an amount of about 1.97 mM, phosphate in an amount of about 6.6 mM and citrate in an amount of about 3.7 mM. This composition is referred to herein by the abbreviation β-low composition. As shown in the non-limiting Table 4B, this composition was found to be stable in salt, exhibit a milkiness appearance, form stable micelles and sufficiently coagulate with Renin.

The β-casein compositions (the low and medium) provided micelles having a diameter within a range of 130-360 nm.

As appreciated by those versed in the art, compositions comprising β-casein as a sole casein protein can be advantageous to individual suffering from allergy to the α and/or κ caseins.

In accordance with some examples, the concentration of the β-casein protein is at least about 1 mg/ml and the concentration of the α-casein is at least 1 mg/ml. In accordance with some examples, the concentration of the β-casein protein is at least about 3 mg/ml and the concentration of the α-casein is at least 3 mg/ml. In accordance with some examples, the concentration of the β-casein protein is at least about 9 mg/ml and the concentration of the α-casein is at least 9 mg/ml. In accordance with some examples, the concentration of the β-casein protein is about 1 mg/ml to about 100 mg/ml and the concentration of the α-casein is 1 mg/ml to about 100 mg/ml. In accordance with some examples, the concentration of the β-casein protein is about 3 mg/ml to about 30 mg/ml and the concentration of the α-casein is 3 mg/ml to about 30 mg/ml.

In some examples, the casein composition comprises (i) a combination of α-casein and β-casein, as the only casein proteins, (ii) a combination of α-casein and β-casein in a total amount of about 21.9 mg/ml, (iii) calcium in an amount of about 34.8 mM (iv) magnesium in an amount of about 4.64 mM, (v) phosphate in an amount of about 15.6 mM, and (vi) citrate in an amount of about 8.7 mM, or any combination of (i)-(vi).

In some examples, the casein composition comprises (i) a combination of α-casein and β-casein, as the only casein proteins, (ii) a combination of α-casein and β-casein in a total amount of about 21.9 mg/ml, (iii) calcium in an amount of about 34.8 mM, (iv) magnesium in an amount of about 4.64 mM, (v) phosphate in an amount of about 15.6 mM, and (vi) citrate in an amount of about 8.7 mM.

This composition is referred to herein by the abbreviation αβ-low composition. As shown in the non-limiting Table 4B, this composition was found to be stable in salt, exhibit a milkiness appearance, form stable micelles and sufficiently coagulate with Renin.

The αβ-low casein compositions provided micelles having a diameter of about 180-200 nm.

As appreciated by those versed in the art, compositions comprising αβ-casein as the only casein proteins can be advantageous to individual suffering from allergy to the κ casein protein.

In accordance with some examples, the concentration of the κ-casein protein is at least about 1 mg/ml and the concentration of the α-casein is at least 1 mg/ml. In accordance with some examples, the concentration of the κ-casein protein is at least about 3 mg/ml and the concentration of the α-casein is at least 3 mg/ml. In accordance with some examples, the concentration of the κ-casein protein is at least about 9 mg/ml and the concentration of the α-casein is at least 9 mg/ml. In accordance with some examples, the concentration of the κ-casein protein is about 1 mg/ml to about 100 mg/ml and the concentration of the α-casein is 1 mg/ml to about 100 mg/ml. In accordance with some examples, the concentration of the κ-casein protein is about 3 mg/ml to about 30 mg/ml and the concentration of the α-casein is 3 mg/ml to about 30 mg/ml.

In some examples, the casein composition comprises (i) a combination of α-casein and κ-casein, as the only casein proteins, (ii) a combination of α-casein and κ-casein in a total amount of about 15.6 mg/ml, (iii) calcium in an amount of 32.4-40 mM, (iv) magnesium in an amount of 4.32-5.33 mM, (v) phosphate in an amount of 14.6-18.0 mM and (vi) citrate in an amount of 8.1-10 mM, or any combination of (i)-(vi).

In some examples, the casein composition comprises (i) a combination of α-casein and κ-casein, as the only casein proteins, (ii) a combination of α-casein and κ-casein in a total amount of about 15.6 mg/ml, (iii) calcium in an amount of 32.4-40 mM, (iv) magnesium in an amount of 4.32-5.33 mM, (v) phosphate in an amount of 14.6-18.0 mM and (vi) citrate in an amount of 8.1-10 mM.

In some further examples, the casein composition comprises α-casein and κ-casein as the only casein proteins in an amount of about 15.6 mg/ml, calcium in an amount of about 40 mM, magnesium in an amount of about 5.33 mM, phosphate in an amount of about 18 mM and citrate in an amount of about 10 mM. This composition is referred to herein by the abbreviation ακ-high composition. As shown in the non-limiting Table 4B, this composition was found to be stable in salt, exhibit a milkiness appearance, form stable micelles, and sufficiently coagulate with Renin.

In some examples, the ακ-casein composition comprises α-casein and κ-casein as the only casein proteins in an amount of about 15.6 mg/ml, yet with calcium in an amount of about 32.4 mM, magnesium in an amount of about 4.32 mM, phosphate in an amount of about 14.6 mM and citrate in an amount of about 8.1 mM. This composition is referred to herein by the abbreviation ακ-medium composition. As shown in the non-limiting Table 4B, this composition was found to be stable in salt, exhibit a milkiness appearance, form stable micelles, and sufficiently coagulate with Renin.

The αк-high and the αк-medium casein compositions provided micelles having a diameter within the range of about 220-370 nm.

As appreciated by those versed in the art, compositions comprising ακ-casein as the only casein proteins can be advantageous to individual suffering from allergy to the β casein protein.

In accordance with some examples, the concentration of the к-casein protein is at least about 1 mg/ml and the concentration of the β-casein is at least 1 mg/ml. In accordance with some examples, the concentration of the к-casein protein is at least about 3 mg/ml and the concentration of the β-casein is at least 3 mg/ml. In accordance with some examples, the concentration of the к-casein protein is at least about 9 mg/ml and the concentration of the β-casein is at least 9 mg/ml. In accordance with some examples, the concentration of the к-casein protein is about 1 mg/ml to about 100 mg/ml and the concentration of the β-casein is 1 mg/ml to about 100 mg/ml. In accordance with some examples, the concentration of the к-casein protein is about 3 mg/ml to about 30 mg/ml and the concentration of the β-casein is 3 mg/ml to about 30 mg/ml.

In some examples, the casein composition comprises (i) a combination of β-casein and к-casein, as the only casein proteins, (ii) a combination of β-casein and к-casein in a total amount of about 12.6 mg/ml, (iii) calcium in an amount of about 20-30 mM, (iv) magnesium in an amount of about 2.67-4.0 mM, (v) phosphate in an amount of 9.0-13.5 mM (vi) and citrate in an amount of about 5.0-7.5 mM, or any combination of (i)-(vi).

In some examples, the casein composition comprises (i) a combination of β-casein and к-casein, as the only casein proteins, (ii) a combination of β-casein and к-casein in a total amount of about 12.6 mg/ml, (iii) calcium in an amount of about 20-30 mM, (iv) magnesium in an amount of about 2.67-4.0 mM, (v) phosphate in an amount of 9.0-13.5 mM (vi) and citrate in an amount of about 5.0-7.5 mM.

In some examples, the casein composition comprises β-casein and к-casein as the only casein proteins in an amount of about 12.6 mg/ml, calcium in an amount of about 30 mM, magnesium in an amount of about 4.0 mM, phosphate in an amount of about 13.5 mM and citrate in an amount of about 7.5 mM. This composition is referred to herein by the abbreviation βκ-medium composition. As shown in the non-limiting Table 4B, this composition was found to be stable in salt, exhibit a milkiness appearance, form stable micelles, and sufficiently coagulate with Renin.

In some examples, the βκ-casein composition comprises β-casein and к-casein as the only casein proteins in an amount of about 12.6 mg/ml, yet with calcium in an amount of about 20 mM, magnesium in an amount of about 2.67 mM, phosphate in an amount of about 9 mM and citrate in an amount of about 5.0 mM. This composition is referred to herein by the abbreviation βκ-low composition. As shown in the non-limiting Table 4B, this composition was found to be stable in salt, exhibit a milkiness appearance, form stable micelles, and sufficiently coagulate with Renin.

The βк-medium and the βк-low casein compositions provided micelles having a diameter within the range of about 140-250 nm.

As appreciated by those versed in the art, compositions comprising βк-casein as the only casein proteins can be advantageous to individual suffering from allergy to the α casein protein.

In accordance with some examples, the concentration of the к-casein protein is at least about 1 mg/ml, the concentration of the β-casein protein is at least about 1 mg/ml and the concentration of the α-casein is at least 1 mg/ml. In accordance with some examples, the concentration of the к-casein protein is at least about 3 mg/ml, the concentration of the β-casein protein is at least about 3 mg/ml and the concentration of the α-casein is at least 3 mg/ml. In accordance with some examples, the concentration of the к-casein protein is at least about 9 mg/ml, the concentration of the β-casein protein is at least about 9 mg/ml, and the concentration of the α-casein is at least 9 mg/ml. In accordance with some examples, the concentration of the к-casein protein is about 1 mg/ml to about 100 mg/ml, the concentration of the β-casein protein is about 1 mg/ml to about 100 mg/ml and the concentration of the α-casein is 1 mg/ml to about 100 mg/ml. In accordance with some examples, the concentration of the к-casein protein is about 3 mg/ml to about 30 mg/ml, the concentration of the β-casein protein is about 3 mg/ml to about 30 mg/ml and the concentration of the α-casein is 3 mg/ml to about 30 mg/ml.

In some examples, the casein composition comprises (i) a combination of α-casein, β-casein and к-casein, (ii) a combination of α-casein, β-casein and к-casein in a total amount of about 25.2 mg/ml, (iii) calcium in an amount of about 25-40 mM, (iv) magnesium in an amount of about 3.3-5.3 mM, (v) phosphate in an amount of 11.3-18.0 mM, and (vi) and citrate in an amount of 7-10 mM, or any combination of (i)-(vi).

In some examples, the casein composition comprises (i) a combination of α-casein, β-casein and к-casein, (ii) a combination of α-casein, β-casein and к-casein in a total amount of about 25.2 mg/ml, (iii) calcium in an amount of about 25-40 mM, (iv) magnesium in an amount of about 3.3-5.3 mM, (v) phosphate in an amount of 11.3-18.0 mM, and (vi) and citrate in an amount of 7-10 mM.

In some examples, the casein composition comprises α-casein, β-casein and к-casein in an amount of about 25.2 mg/ml, calcium in an amount of about 40 mM, magnesium in an amount of about 5.33 mM, phosphate in an amount of about 18.0 mM and citrate in an amount of about 10 mM. This composition is referred to herein by the abbreviation αβκ-high composition. As shown in the non-limiting Table 4B, this composition was found to be stable in salt, exhibit a milkiness appearance, form stable micelles, and sufficiently coagulate with Renin.

In some examples, the αβκ-casein composition comprises the proteins in an amount of 25.2 mg/ml, calcium in an amount of about 32.5 mM, magnesium in an amount of about 4.33 mM, phosphate in an amount of about 14.6 mM and citrate in an amount of about 8.5 mM. This composition is referred to herein by the abbreviation αβκ-medium composition. As shown in the non-limiting Table 4B, this composition was found to be stable in salt, exhibit a milkiness appearance, form stable micelles, and sufficiently coagulate with Renin.

In some further examples, the αβκ-casein composition comprises the proteins in an amount of 25.2 mg/ml, calcium in an amount of about 25 mM, magnesium in an amount of about 3.3 mM, phosphate in an amount of about 11.3 mM and citrate in an amount of about 7 mM. This composition is referred to herein by the abbreviation αβκ-low composition. As shown in the non-limiting Table 4B, this composition was found to be stable in salt, exhibit a milkiness appearance, form stable micelles, and sufficiently coagulate with Renin.

The αβκ-high, αβκ-medium and αβκ-low casein compositions provided micelles having a diameter within the range of about 140-360 nm.

The casein compositions disclosed herein can be used as an ingredient for the production of edible products, e.g. as a food ingredient.

The casein compositions can be provided in any suitable form, for use as a food ingredient, this includes, powder form or (liquid) colloidal form (i.e. a liquid formulation comprising the already formed micelles).

In some examples, the casein compositions can be combined with other edible ingredients.

In some examples, the casein compositions comprises edible oils and fats.

In some examples, the casein compositions comprises edible carbohydrates, such as sugars.

In some examples, the casein compositions comprises edible natural or synthetic polysaccharides (e.g. starch).

In some examples, the casein compositions comprises natural and edible fibers, such as plant derived fibers.

In some examples, the casein compositions comprises edible stabilizer(s).

In some examples, the casein compositions comprises edible emulsifier(s).

In some examples, the casein compositions comprises edible anti-oxidant(s).

In some examples, the casein compositions comprises any one or combination of edible flavors, vitamins, minerals, colors, pigments, dyes and preservatives.

The casein compositions can be used for the production of various food products and to this end may be subjected to further processing steps.

In some examples, the casein compositions are used as a food ingredient for the production of animal-free edible products.

In the context of the present disclosure, when referring to animal-free edible products it is to be understood as encompassing beverages as well as foods that are at least free of milk-derived/isolated casein protein or components thereof. In some examples, the edible product is free of any animal protein. In some examples, the edible product is free of any animal-derived component.

In some examples, the casein compositions is used as a food ingredient for the production of animal-free cheese products.

A non-limiting list of possible cheese products that can be produced using the casein formulation disclosed herein include, mozzarella, cheddar, cream cheese, feta cheese, cottage cheese, parmigiana, halloumi, camembert, Emmental, pecorino, Roquefort, gouda, Sainte-Maure, brie and the like, as appreciated by those versed in the art.

For the production of animal-free cheese products, the casein compositions is typically subjected to at least one step of coagulation, using techniques known in the art.

In some examples, the casein composition is used as a food ingredient for the production of animal-free yogurts. A non-limiting list of possible types of yogurt that can be produced using the casein formulation disclosed herein include unstrained yogurts or strained ("Greek") yogurts, Australian yogurt, Icelandic yogurt, sour cream, Kefir and the like.

For the production of non-animal yogurts, the casein compositions is typically subjected to at least one step of fermentation, using techniques known in the art.

In some examples, the casein compositions is used as a food ingredient for the production of animal-free ice-cream.

For the production of non-animal ice cream, the casein compositions is typically subjected to at least one step of churning that results in at least some percent of overrun, using techniques known in the art.

In some examples, the casein composition is used as a food ingredient for the production of non-animal beverages. A non-limiting list of possible beverages that can be produced using the casein formulation disclosed herein include, animal-free milk, animal-free creamer, animal-free bandung, animal-free chocolate caliente, animal-free coffee milk, animal-free cholado, animal-free ryazhenka, animal-free lassi, animal-free licuado, animal-free leche merengada, and animal-free chocolate drinks.

In some examples, the casein composition is used to form a cream.

In some examples, the casein composition is used for the production of food supplements and/or food additives.

In some examples, the casein is used as a food processing agent e.g. wine fining agent. It is used mainly for fining white wine and Sherries to reduce the level of phenolic compounds associated with bitterness and browning.

Some non-limiting embodiments encompassed by the present disclosure are defined in the following numbered clauses:

1. A method for producing a casein micelle, the method comprises contacting at least one casein protein with a liquid medium comprising calcium and phosphate,
   wherein said liquid medium has a pH of between about 5.0 and 6.5; and/or
   wherein said phosphate is present at a molar concentration that is equal to or below about 20 mM; and/or
   wherein the molar ratio between said calcium and said phosphate is greater than 1.1.

2. The method of clause 1, wherein said at least one casein protein is selected from the group consisting of $\alpha_{s1}$ casein, $\alpha_{s2}$ casein, β casein and κ-casein.

3. The method of clause 1 or clause 2, provided that κ casein is not the sole casein protein.

4. The method of any one of clauses 1 to 3, wherein said pH is between about 5.5 and about 6.5, between about 5.5 and about 6.0, or between about 6.0 and about 6.5.

5. The method of any one of clauses 1 to 4, wherein said phosphate concentration is between about 0.5 mM and about 20 mM, between about 1.5 mM and about 20 mM, between about 2.5 mM and about 20 mM, or between about 3.5 mM and about 20 mM.

6. The method of any one of clauses 1 to 5, wherein said phosphate concentration is between about 5 mM and about 20 mM.

7. The method of any one of clauses 1 to 6, wherein said calcium concentration is between about 1 mM and about 100 mM.

8. The method of any one of clauses 1 to 7, wherein said calcium concentration is between about 10 mM and about 45 mM.

9. The method of any one of clauses 1 to 8, wherein the molar ratio between said calcium and said phosphate is between about 1.1 and about 4.

10. The method of any one of clauses 1 to 9, wherein the molar ratio between said calcium and said phosphate is between about 1.1 and about 3.0.

11. The method of any one of clauses 1 to 10, wherein the molar ratio between said calcium and said phosphate is between about 2 and about 2.5.

12. The method of any one of clauses 1 to 11, wherein said at least one casein protein comprises (i) $\alpha_{s1}$ casein and/or $\alpha_{s2}$ casein, (ii) β casein, and (iii) κ casein as the casein proteins.

13. The method of clause 12, wherein the liquid medium comprises:
   (i) between about 10 and about 20 mM phosphate; and
   (ii) between about 20 and about 45 mM calcium.

14. The method of any one of clauses 1 to 11, wherein said at least one casein protein comprises β casein and κ casein as a sole casein protein.

15. The method of clause 14, wherein the liquid medium comprises:
   (i) between about 5 and about 15 mM phosphate,
   (ii) between about 15 and about 35 mM calcium.

16. The method of any one of clauses 1 to 11, wherein said at least one casein protein comprises (i) $\alpha_{s1}$ casein and/or $\alpha_{s2}$ casein and (ii) κ casein as the only casein proteins.

17. The method of claim 16, wherein the liquid medium comprises:
   (i) between about 10 and about 20 mM phosphate,
   (ii) between about 30 and about 45 mM calcium.

18. The method of any one of clauses 1 to 11, wherein said at least one casein protein comprises $\alpha_{s1}$ casein, $\alpha_{s2}$ casein, and β casein as the only casein proteins.

19. The method of clause 18, wherein the liquid medium comprises:
   (i) between about 10 and about 20 mM phosphate, and
   (ii) between about 30 and about 40 mM calcium 20. The method of any one of clauses 1 to 11, wherein said at least one casein protein comprises β casein as a sole casein protein.

21. The method of clause 20, wherein the liquid medium comprises:
   (i) between about 5 and about 15 mM phosphate, and
   (ii) between about 10 and about 30 mM calcium.

22. The method of any one of clauses 1 to 21, wherein said at least one casein protein comprises:
   (i) $\alpha_{s1}$ casein and the $\alpha_{s2}$ casein in a concentration of between about 12.6 mg/ml and about 25 mg/ml,
   (ii) β casein at a concentration of between about 9.3 mg/ml and about 25 mg/ml,
   (iii) κ casein at a concentration of between about 3.3 mg/ml and about 25 mg/ml, or
   (iv) any combination of (i), (ii), and (iii).

23. The method of any one of clauses 1 to 22, wherein the liquid medium comprises citrate.

24. The method of clause 23, wherein said citrate is at a concentration of between about 1 mM and about 10 mM, between about 3 mM and about 7 mM, between about 8 mM and about 9 mM, between about 8 mM and about 10 mM, between about 5 mM and about 7.5 mM, or between about 7 mM and about 10 mM.

25. The method of any one of clauses 1 to 24, wherein the liquid medium comprises magnesium.

26. The method of clause 25, wherein said magnesium is at a concentration of between about 1 mM and about 10 mM, between about 2 mM and about 4 mM, between about 4 mM and about 5 mM, between about 4 mM and about 6 mM, between about 2 mM and about 4 mM, or between about 3 mM and about 6 mM.

27. The method of any one of clauses 1 to 26, wherein the at least one of the casein proteins is a recombinant casein protein.

28. The method of clause 27, wherein said at least one casein protein comprises $\alpha_{s1}$ casein, $\alpha_{s2}$ casein, β casein and/or κ casein.

29. A casein micelle obtainable or obtained by the method of any one of clauses 1 to 28.

30. A casein micelle comprising at least a casein protein, the casein protein consisting of:
   (i) β casein and κ casein as the sole casein proteins,
   (ii) $\alpha_{s1}$ casein, $\alpha_{s2}$ casein and κ casein as the sole casein proteins,
   (iii) $\alpha_{s1}$ casein, $\alpha_{s2}$ casein, and β casein as the sole casein proteins,
   (iv) β casein as the sole casein protein, or
   (v) κ casein as the sole casein protein.

31. The casein micelle of clause 29 or claim 30, being free of animal-derived proteins.

32. A composition comprising a casein micelle according to any one of clauses 29 to 31.

33. A casein composition comprising casein micelles in a liquid medium, the composition comprising at least one casein protein, calcium and phosphate, wherein:
   said liquid medium has a pH of between about 5.0 and 6.5; or
   said phosphate is present at a molar concentration that equal to or below about 20 mM; or
   the molar ratio between said calcium and said phosphate is greater than 1.1.

34. The casein composition of clause 33, wherein said at least one casein protein comprises at least β casein protein.

35. The casein composition of clause 33 or clause 34, comprising a combination of β casein, with at least one of $\alpha_{s1}$ casein, $\alpha_{s2}$ casein and/or κ casein.

36. The casein composition of any one of clauses 33 to 35, comprising a combination of $\alpha_{s1}$ casein component, $\alpha_{s2}$ casein component and/or κ casein component.

37. The casein composition of any one of clauses 33 to 36, comprising phosphate at a concentration of between 0.5 mM and 20 mM.

38. The casein composition of clause 37, comprising phosphate at a concentration of between 5 mM and 20 mM.

39. The casein composition of any one of clauses 33 to 38, comprising calcium and phosphate at a molar ratio of between 1.5 and 5.

40. The casein composition of clause 39, comprising calcium and phosphate at a molar ratio of between 2.0 and 2.5.

41. The casein composition of any one of clauses 33 to 40, comprising citrate at a concentration of equal to or below 10 mM.

42. The casein composition of any one of clauses 33 to 41, comprising between about 1 mM and about 10 mM magnesium.

43. The casein composition of any one of clauses 33 to 42, wherein at least one of said casein protein is a recombinant protein.

44. The casein composition of any one of clauses 33 to 43, being free of animal-derived protein.

45. The casein composition of any one of clauses 33 to 44, having a pH of between about 5.0 and about 6.5.

46. The casein composition of clause 45, having a pH of between 5.5 and 6.5.

47. An edible product, comprising a casein micelle according to any one of clauses 29 to 31, or a casein composition according to any one of clauses 32 to 46.

As used herein, the forms "a", "an" and "the" include singular as well as plural references unless the context clearly dictates otherwise. For example, the term "a mineral" includes one or more minerals which may be used in the casein formulation.

Further, as used herein, the term "comprising" is intended to mean that the formulation include the recited components, i.e. casein component, but not excluding other elements, such as other proteins, other salts, emulsifiers etc. The term "consisting essentially of" is used to define formulations which include the recited components but exclude other components that may affect the characteristics of the formulation such as functionality of the formulation. "Consisting of" shall thus mean excluding more than trace elements of other components. For example, when defining the casein component as consisting of the β casein component, it is to be understood as lacking other types of casein. Embodiments defined by each of these transition terms are within the scope of this invention.

Further, all numerical values, e.g. when referring the amounts or ranges of the components constituting the casein formulation, these are to be understood as also encompassing approximations which are varied (+) or (−) by up to 20%, at times by up to 10% of from the stated values. It is to be understood, even if not always explicitly stated that all numerical designations are preceded by the term "about".

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described hereinbelow.

DETAILED DESCRIPTION OF NON-LIMITING EXAMPLES

Example 1: Effect of pH on Casein Micelle Formation

To test the effect of pH on the formation of micelles from a mixture of αβκ casein proteins, a solution comprising the casein proteins in their natural concentration (2.4-2.8%) and a lower phosphate concentration (18 mM instead of 24-30 mM) were subjected to different pH levels.

Table 1 provides the different pH levels tested, and the effect thereof, on the eventual micelle formation:

TABLE 1

Effect of pH on micelle formation

| PH level | Result observed |
|---|---|
| 4.5 | Protein precipitation and no micelles were formed |
| 5.0 | Micelles were formed yet were unstable and some protein precipitation was observed. |
| 5.5 | Stable micelles were formed. |
| 6.0 | Stable micelles were formed. |
| 6.8 | Partial protein precipitation, unstable micelles were formed |
| 7 and above | Protein precipitation, no micelles were formed |

Thus, unlike the conditions reported by Schmidt et al (Schmidt D. G. et al. "*Properties of artificial casein micelles. Preparation, size distribution and composition*", Neth. Milk Dairy J. 31:328-341 (1977)) micelle formation in solutions containing αβκ casein proteins, and an initial pH of 5.5-6 instead of ~6.8 significantly improved micellar stability (high milkiness, no precipitation observed) and functionality. This was surprising, as the natural pH of bovine milk is ~6.7, in line with the procedure used by Schmidt et al. and by Aoki. The improved results using a significantly lower pH for micelles formation may suggest that the optimal conditions for forming casein micelles are different from the conditions present in the final milk composition.

Example 2: Preparation and Characterization of Artificial Casein Micelles

Casein micelles were prepared using commercial alpha, beta and kappa caseins (separated from bovine milk) under different buffer conditions and their functionality was determined.

Materials:
α-Casein from bovine milk, C6780, Sigma
β-Casein from bovine milk, C6905, Sigma
κ-Casein from bovine milk, C0406, Sigma Buffer Stock Solutions were Used According to Table 2:

TABLE 2 buffer stock solution compositions

| | Solution #1 | Solution #2 | Solution #3 |
|---|---|---|---|
| $CaCl_2$ | — | 0.43 M | — |
| $MgCl_2$ | — | 0.058 M | — |
| $KH_2PO_4$ | — | — | 0.176 M |
| $Na_2PO_4$ | — | — | 0.176 M |
| Citric acid monohydrate (citrate) | 0.148 M | — | — |
|  | | | |
| pH | 6.7 | 6.7 | 6.7 |

Methods

Micelle Preparation Method

The method of preparation was based on a combination of the teachings of Schmidt et al. 1977, Schmidt 1979 and Aoki 1989.

Specifically, each tested sample included a casein component within a holding medium. The amount of each protein constituting the protein component was fixed, irrespective of whether it is mixed or not with other casein protein as follows:

Alpha-casein (4 $\alpha_{s1}$ casein+1 $\alpha_{s2}$ casein): 12.6 mg/ml
Beta-casein (β-casein): 9.3 mg/ml
Kappa-casein (κ-casein): 3.3 mg/ml Each tested sample differed from the other also by the type of holding medium, water or buffer solution (defined as High salt condition, Medium salt condition or Low salt condition), to provide the final salt concentrations as detailed in Table 3.

TABLE 3

Salt Final Concentration in test formulations

| Formulation | Casein (mg/ml) | Ca (mM) | Mg (mM) | $PO_4$ (mM) | Citrate (mM) |
|---|---|---|---|---|---|
| α high | 12.6 | 40 | 5.33 | 18.0 | 10 |
| α medium | 12.6 | 30 | 4 | 13.5 | 7.5 |
| α low | 12.6 | 20 | 2.66 | 9.0 | 5 |

TABLE 3-continued

Salt Final Concentration in test formulations

| Formulation | Casein (mg/ml) | Ca (mM) | Mg (mM) | PO$_4$ (mM) | Citrate (mM) |
|---|---|---|---|---|---|
| β high | 9.3 | 40 | 5.33 | 18.0 | 10 |
| β medium | 9.3 | 27.4 | 3.65 | 12.3 | 6.9 |
| β low | 9.3 | 14.8 | 1.97 | 6.6 | 3.7 |
| κ high | 3.3 | 40 | 5.33 | 18.0 | 10 |
| κ medium | 3.3 | 22.6 | 3 | 10.2 | 5.7 |
| κ low | 3.3 | 5.2 | 0.7 | 2.4 | 1.3 |
| αβ high | 21.9 | 40 | 5.33 | 18.0 | 10 |
| αβ medium | 21.9 | 37.4 | 5 | 16.8 | 9.4 |
| αβ low | 21.9 | 34.8 | 4.64 | 15.6 | 8.7 |
| ακ high | 15.9 | 40 | 5.33 | 18.0 | 10 |
| ακ medium | 15.9 | 32.4 | 4.32 | 14.6 | 8.1 |
| ακ low | 15.9 | 24.8 | 3.30 | 11.1 | 6.2 |
| βκ high | 12.6 | 40.0 | 5.33 | 18.0 | 10.0 |
| βκ medium | 12.6 | 30.0 | 4.00 | 13.5 | 7.5 |
| βκ low | 12.6 | 20.0 | 2.67 | 9.0 | 5.0 |
| αβκ high | 25.2 | 40 | 5.33 | 18.0 | 10 |
| αβκ medium | 25.2 | 32.5 | 4.33 | 14.6 | 8.5 |
| αβκ low | 25.2 | 25 | 3.33 | 11.3 | 7 |
| αβκ Natural* | 25.2 | 30 | 4 | 30 | 10 |

*Natural represents the amounts of casein and salts (Ca and PO$_4$) as present in bovine milk according to MacMahon and Brown.

The terms "high", "medium", and "low", when referring to the test formulations, indicate the relative salt concentrations, wherein "high" is the herein-identified optimal salt concentration for preparing the αβκ micelles, "low" is the relative salt concentration of the specific subset of casein proteins tested (relative to the total weight of the subset of casein proteins tested compared to αβκ), and "medium" is the average salt concentration between "high" and "low".

For the artificial preparation of the micelles, protein(s) was weighed (63 mg α-casein, 46.5 mg β-casein and 16.5 mg κ-casein) and transferred into appropriate beakers, to which 1.1 ml of filtrated distilled water (DW) were added while stirring. The pH was measured and titrated to 5.5-6.0 as needed (the pH may be raised to above 6.0 but not above 6.5). Then, a further amount of filtrated DW was added while stirring, to bring the overall volume of the mixture to a final volume of 1.25 ml.

To form the test samples, caseins (0.25 ml each) were transferred into marked 1.5 ml Eppendorf tubes and water or buffer was gradually added while mixing, according to Table 2 (0.25 ml for αβκ, 0.5 ml for αβ, ακ and βκ, 0.75 ml for α, β and κ alone). The pH of each test sample was adjusted to 5.5-6 as needed and the samples were further mixed at room temperature for 1 hour.

Overall, the Eppendorf tubes were divided into two groups:
Group I: formation of casein micelles in water;
Group II: formation of casein micelles in buffer solution according to Table 3.

Characterization Methods:

The effect of the different salts' concentrations on the size and the functionality (coagulation capability) of the micelles was determined. Specifically, Micelle formation and Size of the formed micelles were determined using dynamic light scattering for colloids (DLS, Nanophox, Sympatec). Samples were measured at 25° C., in either UVette disposable cuvettes (Eppendorf AG, 50 µl non-diluted sample for caseins in water) or in 4 ml Acrylic cuvettes (Sarstedt AG & Co, 2 ml of X100 diluted sample for caseins in buffer). Measurements with fit errors of <0.2% were regarded as reliable.

Coagulation with Renin was assessed by visual inspection and by comparison of 280 nm absorbance of caseins in water vs. 280 nm absorbance of the supernatant of caseins following reaction with Rennin.

Specifically, 25 µl of X3 diluted Rennin (Valiren 750) were added to 500 µl of caseins. After 30 min of incubation at RT, samples were visually inspected and spinned-down for 3 sec at 600 rpm. Supernatants were measured at A280 and A260. The absorbances were compared to those of caseins in water (maximal total casein amount), where (260/280<0.7), $(A280_{total}-A280_{sup})/A280_{total}$ is the micellar casein fraction of stable and coagulating micelles. The results are shown in Table 5 below.

In addition, Optigraph measurements were conducted to further assess the coagulation of the synthetic casein micelles. For the Optigraph measurements, samples of αβκ in high salts condition were compared to raw milk. Both samples were diluted 1:1 in saline and measured in duplicate wells according to the manufacturer's instructions. Briefly, renin was added to the wells, and the process of coagulation was followed in real-time using NIR. The output included the parameters of coagulation time and curd strength. The results are shown in Table 6 below.

Milkiness: was qualitatively assessed by visual inspection of some of the samples Stability was determined by visual inspection and the appearance of sediments when no Rennin is added.

Results

Micelle Formation—Visual Determination

The formation of micelles and their dimensions were verified by DLS and found to be within the range of 100 nm and 500 nm (not shown).

Figure 1:
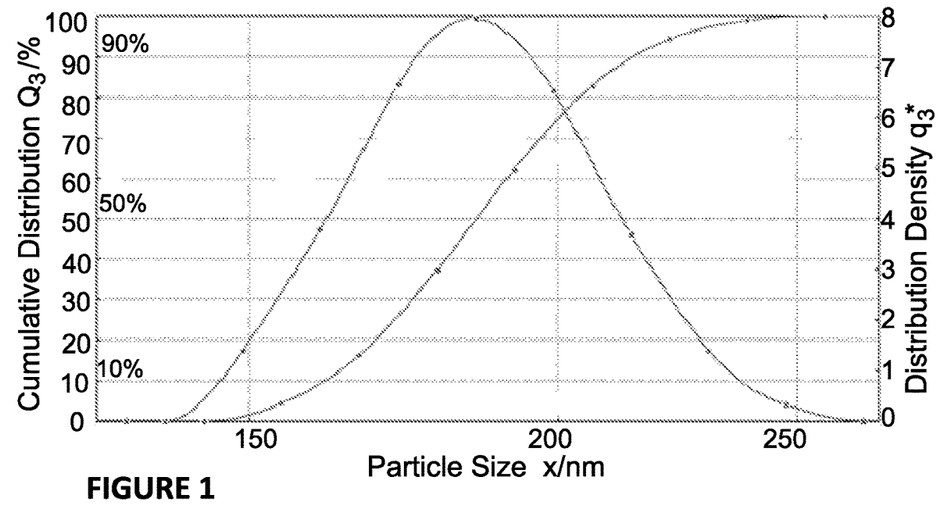
FIG. 1 is a graph showing dynamic light scattering (DLS) measurements of casein micelles formed from a formulation identified as $\alpha\beta\kappa$ high salt and having the size of ~180 nm, according to the distribution density curve, and cumulative distribution (S-shape curve).
Figure 2A:
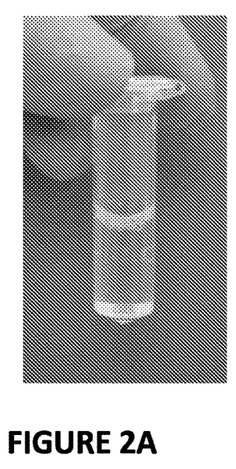
FIGS. 2A-2C are photographic images of $\alpha\beta\kappa$-casein protein combinations after mixing with water (FIG. 2A), natural buffer (FIG. 2B) or high salt buffer conditions ("$\alpha\beta\kappa$-high", FIG. 2C), and without adding Renin.
Figure 2B:
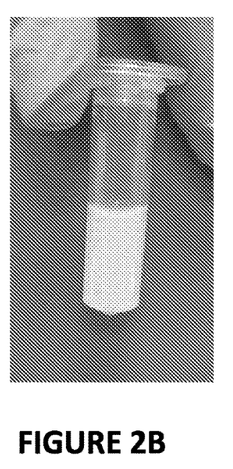
Figure 2C:
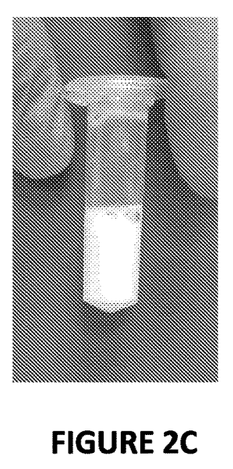

In addition, the formation of micelles was determined by visual inspection. FIGS. 2A-2C show the images of casein in water (FIG. 2A), where the liquid is transparent, this being indicative that no functional micelles are formed; αβκ-casein in a Natural salt formulation (FIG. 2B, see in this connection αβκ Natural in Table 3), where there the liquid is semi-transparent, indicative that there is only partial functional micelle formation; and αβκ in high salt concentration (FIG. 2C) where a milky liquid is obtained, indicating that with high salt formulation, functional micelles are formed.

Stability

Figure 3A:
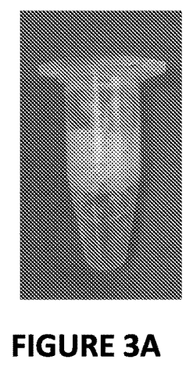
FIGS. 3A-3C are photographic images of $\alpha\beta$ casein combinations 1 hour from addition of high-salt solution, showing instability (FIG. 3A); medium salt solution, showing some precipitation (FIG. 3B); and low salt solution, showing stability (FIG. 3C).
Figure 3B:
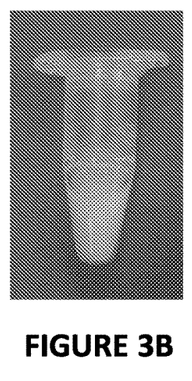
Figure 3C:
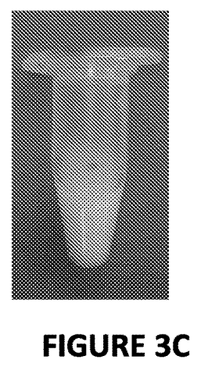

The stability was determined by visual inspection and the appearance of sediments when no Rennin is added. Results for αβ-casein at high, medium and low salt conditions are provided in FIGS. 3A-3C, respectively as an example.

Micelle Functionality:

The capability of the different casein formulations in water or in salt conditions to form into micelles, their properties and capability to coagulate by Renin are summarized in Table 4A (water), Table 4B (salt solution).

TABLE 4A

| Characterization in Water | | | | |
|---|---|---|---|---|
| Casein formulation | Formation in water | Stability in water | Milkiness | Coagulation by Rennin |
| α | — | — | — | No |
| β | √ | √ | — | Partial* |
| κ | √ | √ | √ | √ |
| αβ | √ | √ | — | Partial* |
| ακ | √ | √ | — | Partial* |
| βκ | √ | √ | — | Partial* |
| αβκ | √ | √ | — | Partial* |

Partial* - as compared to caseins in salt solution

TABLE 4B

Characterization in salt solution

| Casein formulation | Stability in salt | Milkiness observation | Micelles formation in salt | Coagulation by Rennin |
|---|---|---|---|---|
| α high | — | — | — | — |
| α medium | — | — | — | — |
| α Low | — | — | — | — |
| β high | — | √ | √ | √ |
| β medium | √ | √ | √ | √ |
| β low | √ | √ | √ | √ |
| κ high | — | √ | — | — |
| κ medium | — | — | — | — |
| κ low | — | — | √ | — |
| αβ high | — | √ | — | √ |
| αβ medium | — | √ | √ | √ |
| αβ low | √ | √ | √ | √ |
| ακ high | √ | √ | √ | √ |
| ακ medium | √ | √ | √ | √ |
| ακ low | — | √ | — | √ |
| βκ high | — | Partial* | √ | √ |
| βκ medium | √ | √ | √ | √ |
| βκ low | √ | √ | √ | √ |
| αβκ high | √ | √ | √ | √ |
| αβκ medium | √ | √ | √ | √ |
| αβκ low | √ | √ | √ | √ |
| αβκ Natural | √ | Partial* | √ | — |

*Partial means samples being semi-transparent

The functionality of the different micelles was also spectrophotometrically, the results of which are presented in Table 5.

TABLE 5

Spectrophotometric analyses of casein micelles

| | Caseins in water | | Caseins in salt Supernatant after Rennin addition | | Functional casein fraction |
|---|---|---|---|---|---|
| Salt condition | A280 | 260/280 | A280 | 260/280 | |
| α high | 12.3 | 0.62 | — | — | — |
| α medium | 12.3 | 0.62 | — | — | — |
| α Low | 12.3 | 0.62 | — | — | — |
| β high | 5.1 | 0.6 | 2.1 | 0.6 | * |
| β medium | 5.1 | 0.6 | 2.6 | 0.6 | 0.49 |
| β low | 5.1 | 0.6 | 4.0 | 0.6 | 0.22 |
| κ high | 4.1 | 0.59 | 2.5 | 0.6 | * |
| κ medium | 4.1 | 0.59 | 2.4 | 0.6 | * |
| κ low | 4.1 | 0.59 | 2.4 | 0.6 | * |
| κ in water | 4.1 | 0.59 | 2.0 | 0.6 | 0.51 |
| αβ high | 20.4 | 0.6 | 2.3 | 0.6 | * |
| αβ medium | 20.4 | 0.6 | 3.3 | 0.6 | * |
| αβ low | 20.4 | 0.6 | 3.3 | 0.6 | 0.84 |
| ακ high | 17.9 | 0.61 | 3.1 | 0.6 | 0.83 |
| ακ medium | 17.9 | 0.61 | 3.3 | 0.6 | 0.82 |
| ακ low | 17.9 | 0.61 | 2.9 | 0.6 | * |
| βκ high | 12.4 | 0.61 | 3.8 | 0.6 | * |
| βκ medium | 12.4 | 0.61 | 4.0 | 0.6 | 0.68 |
| βκ low | 12.4 | 0.61 | 3.8 | 0.6 | 0.69 |
| αβκ high | 23.1 | 0.6 | 4.2 | 0.5 | 0.82 |
| αβκ medium | 23.1 | 0.6 | 5.5 | 0.7 | 0.76 |
| αβκ low | 23.1 | 0.6 | 9.1** | 0.8 | 0.61 |
| αβκ Natural | 23.1 | 0.6 | 23** | 1.0 | 0.00 |

*Due to significant precipitation prior to rennin addition, it was not possible to accurately determine the level of coagulation
**Extrapolated A280 value (as A260/A280 > 0.7)

Coagulation was also confirmed by Optigraph and the results are shown in Table 6.

TABLE 6

Coagulation time and strength time

| Sample | Avg. Coagulation time (min) | Avg. Curd strength (V) |
|---|---|---|
| Raw bovine milk | 19:26 | 1.83 |
| αβκ high | 9:52 | 1.89 |

Table 6 surprisingly show that with the αβκ formulation in high salt concentration the coagulation time was half the time of the normal time while the strength of the resulting curd was essentially the same.

The results show that while the coagulation strength of the reconstituted micelles was the same or slightly better compared to raw milk, the coagulation time of the micelles was half, indicating a highly efficient process.

Without being limited thereto, the results presented herein suggest that:

- For the formation of a homogenous population of functional micelles it is possible to use only the β casein. There is some preference to the use of medium or low salt concentration, at least in terms of functionality (Table 4B).
- α casein should preferably be combined with at least one other casein protein in order to obtain functional micelles.
- Interestingly, κ-casein can form functional micelles in water; and yet, when prepared in salt environment, requires the presence of at least one other casein protein.
- αβ casein combination forms stable and functional micelles predominantly at low and medium salt concentration.
- ακ casein combination preferably requires high salt concentration in order to obtain a homogenous population of functional micelles.
- βκ casein combination preferably requires low and medium salt concentration in order to obtain a homogenous population of functional micelles.
- Finally, αβκ provide best micelles at medium to high salt concentration.

Example 3: Micelle Formation with Non-Natural Concentrations of Casein Component To assess the qualities of micelles formed at higher casein concentration, micelles were formed using total casein concentrations of 2.5%. In some cases, improvement of casein stability and coagulation level was observed (see Table 7). Higher coagulation was observed especially for kappa casein in water and for beta casein in medium/low salt conditions. Improvement in micelles stability was observed in αβ medium and ακ low conditions. In all cases A260/A280 was <0.7.

TABLE 7

Effect of salt conditions

| Sample name + salt conditions | Coagulation level 2.5% total casein |
|---|---|
| β high | * |
| β medium | 63% |
| β low | 62% |
| κ in water | 79% |
| αβ high | * |

TABLE 7-continued

Effect of salt conditions

| Sample name + salt conditions | Coagulation level 2.5% total casein |
|---|---|
| αβ medium | 85% |
| αβ low | 85% |
| ακ high | 88% |
| ακ medium | 88% |
| ακ low | 88% |
| βκ high | 71% |
| βκ medium | 69% |
| βκ low | 69% |

*Due to significant precipitation prior to rennin addition, it is not possible to accurately determine the level of coagulation Example 4: Preparation and Characterization of Recombinant Casein Micelles Each of the casein proteins are recombinantly prepared making use of precision fermentation.

The procedure involves the following steps:

Gene synthesis of optimized DNA sequences for the four main casein proteins ($\alpha_{s1}$, $\alpha_{s2}$, β and κ), which are then, individually inserted into an appropriate expression vectors (gene harboring vector), a list of possible vectors described above.

A host cell is then transformed with the desired gene-harboring vectors using standard electroporation/transfection procedures. The organism may allow for post-translational modifications (e.g. phosphorylation) and/or secretion of the proteins to the growth media (for scalability, ease of purification), depending on the expression vector, host organism and on the protein of interest.

Express the gene by the host cell and purify thus expressed casein protein. Cells are grown in an appropriate growth medium, containing all the needed materials within vessels such as flasks or fermenters. Protein induction is initiated by either adding the appropriate factor (e.g. IPTG for bacterial expression) or by using a constitutive expression strategy. Following the accumulation of the desired protein within the cells, or in the growth media, the protein is isolated and purified by means of acid/salt precipitation and/or chromatographic separation and/or ultrafiltration and/or drying (by e.g. lyophilization).

Example 5: Preparation Mozzarella Using Casein from Bovine Milk

As a proof of concept, casein micelles were isolated from bovine milk. These micelles were then combined with fat and sugar according to the following procedure:

Pre-Preparation:

Citric acid solution: Dissolve 1.75 gr of citric acid in 50 ml of DW

Rennin solution: Add 2 drops of rennin to 50 ml of DW

Add 25 g (net) of micellar casein (MC), 35 g refined coconut oil, 16 g glucose and 1 g table salt into a pot with 1 L DW. Stir the pot to dissolve the ingredients.

Measure the pH of the solution, adjust the pH to 5-5.5 by adding ~40 ml citric acid while stirring (be careful do not get pH below 5).

Heat the solution to 32° C. while stirring and remove from the heat

Slowly add the rennin solution and stir for 25 seconds

Incubate the pot with close lid in RT for 5 minutes

Cut the curd into small cubs

Heat the pot to 40° C. for 5 minutes. Rotate the pot for mixing and for heat distribution (do not stir)

Separate the curds from the liquid. Squeeze the liquid into an appropriate vessel Heat the curd for 10 sec in a microwave, stretch and fold a few times, repeat twice Incubate the cheese in the liquid for 10 minutes Remove the liquid from the Mozzarella and weigh the saturated cheese. Note the stretchiness, hardness and general texture The resulting mozzarella cheese was examined for its stretchability upon heating. Specifically, stretchiness was first assessed qualitatively. This was followed by double-blind tasting by 20 individuals. The cheese was indistinguishable from regular dairy cheese and showed similar qualities in terms of flavor, smoothness, softness, stretchiness and meltiness.

In addition, the following rheological properties of the mozzarella cheese were examined: springiness, cohesiveness, gumminess, chewiness and hardness. These were determined by a texture profile analysis (TPA) using the Universal TA.XT2 Texture Analyser (Stable Micro Systems Ltd., England), using the conditions according to the manufacturer's instructions and acceptable parameters.

The invention claimed is:

1. A method for producing a casein micelle, the method comprising:
    contacting at least one casein protein with a liquid medium comprising calcium and phosphate;
    wherein said liquid medium has a pH of between about 5.0 and 6.5;
    wherein said phosphate is present at a molar concentration that is equal to or below about 20 mM; and
    wherein the molar ratio between said calcium and said phosphate is greater than 1.1, wherein said at least one casein protein comprises αs1 casein and/or αs2 casein, and β casein as a sole casein proteins.

2. The method of claim 1, wherein the method is characterized by at least one of the following:
    (i) said pH is between 5.5 and 6.5;
    (ii) said phosphate concentration is between about 0.5 mM and about 20 mM or between about 5 mM and about 20 mM;
    (iii) said calcium concentration is between about 1 mM and about 100 mM or between about 10 mM and about 45 mM; or
    (iv) the molar ratio between said calcium and said phosphate is between about 1.1 and about 4, between about 1.1 and about 3.0, or between about 2 and about 2.5.

3. The method of claim 1, wherein said at least one casein protein comprises (i) $\alpha_{s1}$ casein and/or $\alpha_{s2}$ casein, (ii) β casein, wherein the liquid medium comprises:
    (i) between about 10 and about 20 mM phosphate; and
    (ii) between about 20 and about 45 mM calcium.

4. The method of claim 1, wherein said at least one casein protein comprises $\alpha_{s1}$ casein and/or $\alpha_{s2}$ casein, and β casein as a sole casein protein(s) and wherein the liquid medium comprises:
    (i) between about 10 and about 20 mM phosphate; and
    (ii) between about 30 and about 40 mM calcium.

5. The method of claim 1, wherein said at least one casein protein comprises:
    (i) $\alpha_{s1}$ casein and/or the $\alpha_{s2}$ casein in a concentration of between about 12.6 mg/ml and about 25 mg/ml; and/or (ii) β casein at a concentration of between about 9.3 mg/ml and about 25 mg/ml.

6. The method of claim 1, wherein the method is characterized by at least one of:
(i) the liquid medium comprises citrate;
(ii) the liquid medium comprises magnesium; or
(iii) the at least one of the casein proteins is a recombinant casein protein.

7. The method of claim 6, wherein the method is characterized by at least one of:
(i) said citrate is at a concentration of between about 1 mM and about 10 mM;
(ii) said magnesium is at a concentration of between about 1 mM and about 10 mM; or
(iii) said recombinant one casein protein comprises $\alpha_{s1}$ casein, $\alpha_{s2}$ casein, and/or β casein.

8. A casein micelle obtainable or obtained by the method of claim 1.

9. The casein micelle of claim 8, being free of animal-derived proteins.

10. A casein micelle, comprising:
at least one casein protein, the at least one casein protein consisting of:
$\alpha_{s1}$ casein, $\alpha_{s2}$ casein, and β casein.

11. The casein micelle of claim 10, being free of animal-derived proteins.

12. A composition comprising casein micelles according to claim 8.

13. The composition according to claim 12, wherein the composition is an edible product.

\* \* \* \* \*